UNITED STATES PATENT OFFICE.

MARY WATSON, OF LONDON, ENGLAND.

MALTED FOOD.

SPECIFICATION forming part of Letters Patent No. 531,013, dated December 18, 1894.

Application filed December 28, 1893. Serial No. 494,992. (No specimens.) Patented in England May 31, 1893, No. 10,689.

*To all whom it may concern:*

Be it known that I, MARY WATSON, a subject of the Queen of Great Britain, residing at 18 Auriol Road, West Kensington, London, England, have invented an Improved Preparation of Malted Pulse Food, (for which I have obtained British Patent No. 10,689, dated May 31, 1893;) and I do hereby declare that the following is a full, clear, and exact description of the invention, which will enable others skilled in the art to which it appertains to make and use the same.

This invention relates to a new or improved manufacture of food of a palatable, nutritious and digestible nature, suitable for the use of infants or adults, from beans, peas, lentils, or the seed of any other suitable leguminous plant, or of any of these combined (but preferably from the lentil as being rich in albuminoid matter and phosphates, and the bean known as the soy bean as being richer in albuminoid matter and fat, and the leguminous seed known as the pea nut or ground nut which is exceedingly rich in oily or fatty matter, or any one or two of these three) and malt of barley, wheat, oats, or other cereals or any of these malts combined, or with any extract of or from malt, or infusion of malt. I take the seed of any leguminous plant, as for instance the lentil, and preferably the Egyptian or Indian lentil, and after decortication, and with or without soaking and boiling and steaming it, or treating it by any one or two of these three processes, but preferably after soaking it only, for about twelve hours, in the quantity of water the lentils will absorb, I subject the soaked lentils to a roasting, baking, or other heating process, for a period sufficient to break up or rupture the starch granules contained in the said seed, continuing this roasting, baking, or heating process until a portion of the starch contained in the seed is converted into dextrin, and a pleasing flavor is obtained. This roasting or baking process may be carried out at any suitable temperature, according to the nature of the seed (or seeds) employed, and in the case of the lentil I find this can be done efficiently by baking the soaked lentils for one hour at a temperature of about 210° Fahrenheit, continuing the baking for a further hour at a temperature of 275° Fahrenheit, rising gradually to 315° Fahrenheit, and then continuing the baking, until the lentils are crisp, at a temperature of about 250° Fahrenheit. I then reduce the said seed (or seeds) to powder or flour, and to this flour I add the flour of malted barley, wheat, oats, or other cereals, or a combination of these malted cereals, in any proportion of from five to thirty-five parts by weight of said malt flour, or in some cases possibly as high as forty parts of malt flour, to each one hundred parts by weight of the flour of the leguminous seed (or seeds) employed. Preferably I employ only some ten parts by weight of the flour of light kiln-dried malted barley of high diastatic power as containing sufficient diastase to act on the starch contained in a combination of lentil and malt flour of such proportions. The quantity of malt employed may vary according to its diastatic power or the quantity of diastase required in the food, or, if increased flavor or color in the food is a desideratum, high-dried or dark malt of any description may be employed in any suitable quantity.

To raise the proportion of albuminoids and fatty matters in the food I employ, as an additional constituent thereof, the required quantity of preferably the soy bean, treated by any or all of the cooking processes previously described (I find baking for one hour at a temperature of about 300° Fahrenheit is a suitable process with this seed), or when I desire to keep the ratio of albuminoids virtually unchanged (as in the case of the lentils) and increase the oily or fatty matter only, in the food, I employ the required quantity of preferably the pea nut (or ground nut) treated by any or all of the cooking processes previously described (I find baking for thirty minutes at a temperature of 300° Fahrenheit rising gradually to a temperature of 330° Fahrenheit is a suitable process with this seed) thereafter reducing the soy bean to a smooth oily powder or the pea nut (or ground nut) to a smooth oily paste, as the case may be, and then thoroughly incorporating it with the food. Such oily or fatty additions should be the last process in the manufacture of this particular form of my food, in order that the oily or fatty coating of the food may preserve the malt and dextrin contained in the food from atmospheric influences.

As a modification of my said invention I may use in lieu of the flour of malted cereals as aforesaid any suitable kind of malt extract or infusion of malt, or product from malt having diastatic action, applied in any suitable manner, and in quantity sufficient to effect the same diastatic action, or for purposes of coloring.

As a modification of my said invention I may subject the malted food manufactured as hereinbefore described (and before the admixture of the aforesaid oily or fatty matters) to the action of moisture in suitable quantity, or subject the unmalted flour of the roasted or baked seeds as hereinbefore described to the action of such moisture with any suitable kind of malt extract, diastatic product of malt, or infusion of malt added, keeping the said malted food or roasted or baked flour with malt extract or diastatic product of malt or infusion added, for the requisite period at a temperature sufficient to permit of diastatic action to the extent I may desire, thereafter drying the said food by baking or other suitable process at a temperature suited either to preserve or to render inert (as I may desire) any diastase remaining in the said food, and thereafter I again reduce the said food to powder or flour, then making the oily or fatty additions as aforesaid, but preferably I mix the unmalted flour of the roasted or baked seed (or seeds) with sufficient water to bring it to the consistency of thick cream, and then I raise the said mixture to boiling or nearly boiling point in a vessel so surrounded by boiling water or steam that burning of the food is not possible, keeping the said mixture at the said temperature for a period of about thirty minutes to completely gelatinize the starch contained in said roasted or baked seed (or seeds). I then allow the gelatinized mixture to cool to about 150° Fahrenheit and then stir into it a perfectly even milk of malt, made by taking about ten per cent. as aforesaid of green malt (which has high diastatic power) and thoroughly mashing it in warm water and straining it free from cartilage and débris. I then keep the mixture at a temperature of from 150° Fahrenheit to 160° Fahrenheit for a period of about three hours, stirring it at intervals, thereafter drying the said mixture at a temperature not exceeding about 170° Fahrenheit if I desire to preserve in an active state any unused diastase remaining in the said malted mixture, or at any temperature, preferably below actual boiling point, if I desire to render the said diastase inert, and thereafter I reduce the malted mixture to powder or flour, then adding the oily or fatty additions as aforesaid, the said oil or fat being of particular value in protecting the maltose in the food from deliquescence. As an alternative but less efficient method of manufacture I may reduce the leguminous seed or seeds employed (or such seed or seeds powdered) to a gelatinous state by boiling or steaming only, and then malt it by any of the methods before indicated, afterward drying the food and otherwise treating it as described.

When I desire to manufacture a food of rich quality I employ preferably the soy bean or peanut (or ground nut) separately or combined (and in some cases I find it preferable and expedient to express or remove by mechanical or other suitable means a portion of the oily or fatty matter contained in such seed or seeds), and in this process I use preferably an increased quantity of malt, either light kiln-dried or high dried or dark malt of any description or any combination of these malts. Such food may be consumed advantageously as a beverage, and I therefore preferably accentuate the flavor of the seed employed by roasting or baking it at a higher temperature, and, or, by continuing this roasting or baking process for a longer period than before mentioned. As a combination for rich food purposes I find that fifty per centum by weight of roasted or baked pea nuts, (or ground nuts,) ten per centum by weight of roasted or baked soy beans, and forty per centum by weight of malt is one of many good combinations, but, of necessity, I do not bind myself to any particular quantities, or temperatures as mentioned in this statement, and the methods of manufacture described in this statement are also capable of many variations.

Before the oily or fatty addition is made to my food, or after the manufacture of my food is completed by the processes indicated or by other suitable process or processes, I may find it advisable to incorporate with the food or foods pepsin or agents having peptonizing powers, sugar in any form, salt, bi-carbonates, starchy matters, flavorings, essences, or other ingredients, but these incorporations form no part of my invention.

Having thus described my invention, what I claim, and desire to secure by Letters Patent, is—

1. A composition of matter comprising cooked and powdered leguminous seed, malt, and vegetable fatty matter combined in or about the proportions specified, such fatty matter forming a coating which protects the malt and other perishable matter from atmospheric and other deteriorating influences.

2. A composition of matter comprising cooked and powdered leguminous seed, diastatic malt product, and vegetable fatty matter combined in or about the proportions specified, such fatty matter forming a coating which protects the diastatic malt product and other perishable matter from atmospheric and other deteriorating influences.

In testimony whereof I have hereunto set my hand this 15th day of December, 1893.

MARY WATSON.

Witnesses:
  J. WINLO HOAR,
  THOMAS LAKE.